(12) United States Patent
Fung

(10) Patent No.: US 6,236,792 B1
(45) Date of Patent: May 22, 2001

(54) UNIQUE FIBER-OPTIC DISPLAY DEVICE

(76) Inventor: Chun Chung Fung, Hoi Luen Ind. Centre, 55 Hoi Yuen Road, Kowloon, Hong Kong (CN)

( * ) Notice: Subject to any disclaimer, the term of this patent is extended or adjusted under 35 U.S.C. 154(b) by 0 days.

(21) Appl. No.: 09/336,518

(22) Filed: Jun. 18, 1999

Related U.S. Application Data

(60) Provisional application No. 60/090,468, filed on Jun. 24, 1998.

(51) Int. Cl.[7] ........................................................ G02B 6/04

(52) U.S. Cl. ............................ 385/115; 385/120; 348/272

(58) Field of Search ..................................... 385/115, 116, 385/120; 40/547; 349/62; 362/548, 123; 359/889; 348/272

(56) References Cited

U.S. PATENT DOCUMENTS

| 5,381,502 | * | 1/1995 | Veligden | 385/115 |
| 5,588,235 | * | 12/1996 | Juchymenko et al. | 40/547 |
| 5,953,469 | * | 9/1999 | Zhou | 385/22 |

* cited by examiner

Primary Examiner—Rodney Bovernick
Assistant Examiner—Ellen E. Kim
(74) Attorney, Agent, or Firm—Roger A. Marrs

(57) ABSTRACT

A fiber optical device is employed to produce a unique display. The device includes an elongated bundle of fibers for conducting light from a light source to remote terminating ends. The fiber ends produce a pattern representing a graphic symbol or character. The display is enhanced by employing fibers lying flat side-by-side with selected exterior portions roughened and some selected exterior portions masked. These latter portions provide a secondary display of light augmenting the first mentioned pattern. A color wheel and lens is disposed between the light source and the fiber bundle and is edge driven by gearing and a motor.

2 Claims, 1 Drawing Sheet

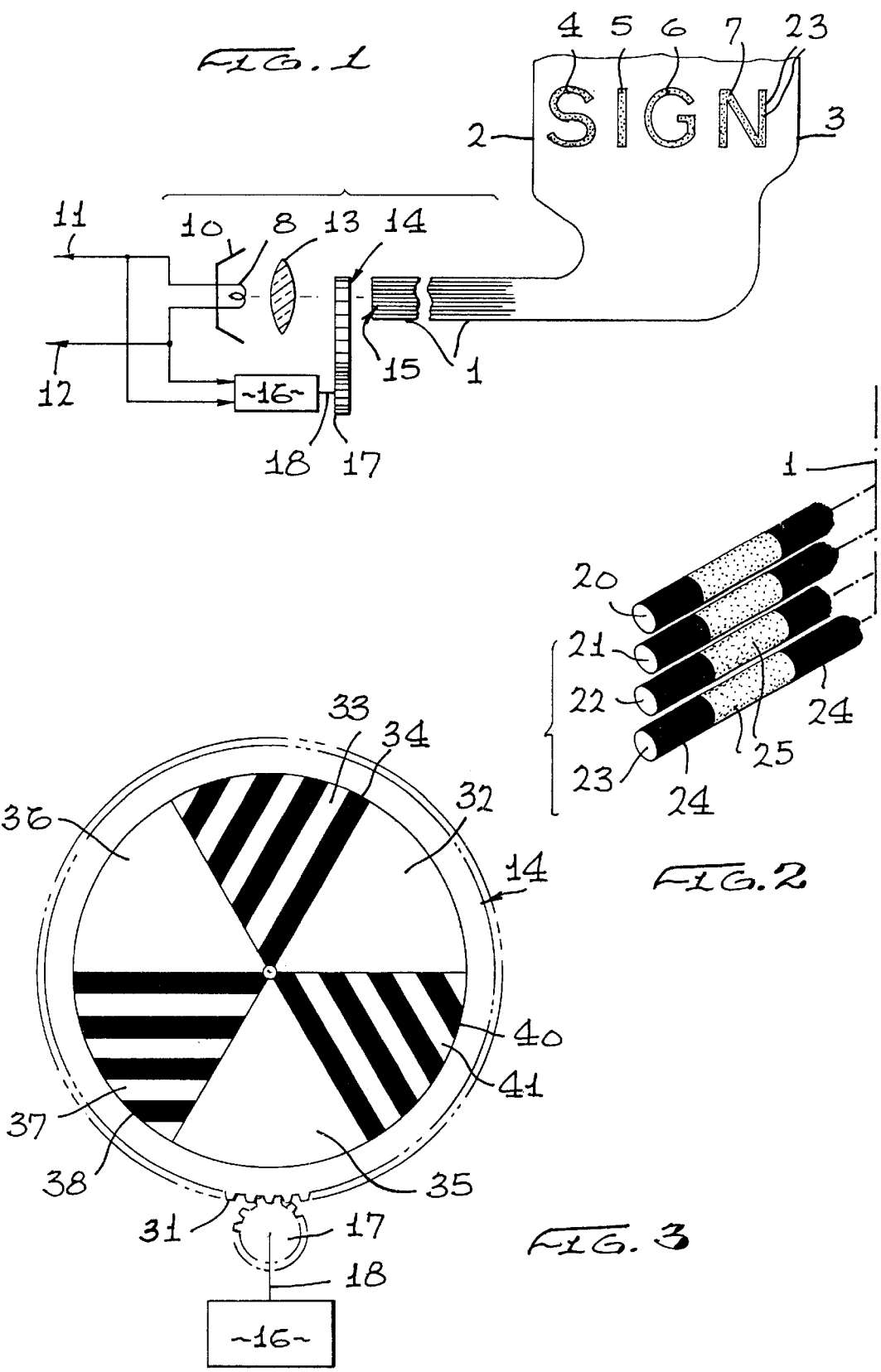

UNIQUE FIBER-OPTIC DISPLAY DEVICE

Priority claim based on Ser. No. 60/090,468 filed Jun. 24, 1998.

BACKGROUND OF THE INVENTION

1. Field of the Invention

The present invention relates to an apparatus and a method by which light normally passing through a bundle of fibers is made to pass outside the bundle of fibers as the light passes along the fibers for purposes of display. In addition, a unique method of generating the light ahd introducing the light to the fiber bundle is involved.

2. Brief Description of the Prior Art

Conventional signs and displays utilizing fiber optics are well known wherein light from a single source enters the end of a fiber bundle where all the fiber bundles are gathered together. The fibers are then spread out so that the light comes out the other or terminal end. The fibers' ends are formed into a display picture or a word or letter such that the display will be seen brightly as if the light were emitting from that picture or word.

Also in prior applications, color wheels or pattern wheels are sometimes inserted between the source of light and the bundle of fibers. As the wheel turns, the color and/or pattern of light impacting the fiber bundle changes. This is normally accomplished by mounting a color wheel on a shaft and spinning it between the light source and the fiber bundle. One of the challenges in the prior art is that by the time the fibers are spread out adequately to form the picture image, the actual area is so small and so intense, that the desired affect cannot be achieved. Often, users of fiber optics will add a small diffuser device at the end of each fiber to spread out the light at that point. This is an expensive alternative.

As far as spinning the wheel between the light source and the fiber bundle, it is sometimes difficult for the shaft to be driven properly next to the light source and will often have to be made very large.

SUMMARY OF THE INVENTION

Accordingly, the above problems and difficulties are obviated by the present invention wherein the fibers at the terminal end of a fiber bundle used to create the display are laid flat. The sides of the fibers are scored in such a manner that the light is emitted along the fiber as well as out the terminal end of the fiber. This allows for a larger area to be displayed at the ends of the fiber bundle without adding additional cost of adding an additional diffuser as in conventional devices. The scoring of the fibers may be selective to determine what area emits light or a mask in the form of paint or silk screen ink may be applied to define the sign to be presented.

Additionally, a wheel may be inserted between a light source and the fiber bundle is not mounted on a shaft but is rather contained on its circumference in a mounting tube and driven by gear teeth on the external edge of the wheel.

Therefore, the primary purpose of the invention is for the illumination of special signs primarily through the use of fiber optics, where the light is not only conducted through each fiber, but is allowed to emit from the side of the fibers as well as the terminal end of each fiber.

It is a further object of the invention to facilitate much more interesting optical displays and effects while utilizing fiber optics.

It is another object of the invention to accomplish the above with a minimum of additional cost.

Still another object of the invention is to provide a fiber optic display device using a minimum sized wheel between a light source and a fiber bundle which is edge driven from the side.

Yet still another object of the invention is to maintain a small physical package as far as the light source and driver are concerned while having a large display or presentation.

An object of the invention also resides in accomplishing all of the other objects with a minimum of cost.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 depicts a typical sign operated from a fiber optic bundle with its light source and color wheel in accordance with the present invention;

FIG. 2 depicts a broken out area of FIG. 1 showing the fibers laid flat; and

FIG. 3 is an indication of how the color wheel is driven.

DESCRIPTION OF THE PREFERRED EMBODIMENT

Referring now to FIG. 1, it can be seen that a bundle of fibers 1 are spread out in an area between 2 and 3 to make a flattened area or a sign. Letters 4, 5, 6 and 7 represent a sign or pattern that can be displayed. Light is created by light source 8, which is powered by electrical energy entering on lines 11 and 12 which also provides power to a motor 16. The light generated is reflected by reflector 10 and concentrated by lens 13, such that the light will be focused through a revolving color wheel 14 into the end of a fiber bundle 15.

Lens 13 is optional depending on intensity of the light desired and the optical system used. Shaft 18 drives gear 17 which is intermeshed with the teeth 31 on the outside or outer edge of color wheel 14 to cause it to rotate. This will be subsequently discussed with more detail.

Referring now to FIG. 2, a small portion of the hundreds of fibers are depicted that make up the sign area 2 through 3 of FIG. 1. Four fibers are shown, 20, 21, 22 and 23. The fibers are laid such that they are flat and side by side rather than concentrated into the cable of bundle 1. The surface area of each fiber 25 has been roughened either through slight kinking, sand blasting or some manner to cause the light to emit to the side of the fiber. The areas 24 are masked or coated to prevent any light from escaping from the fiber at this area. Thus, by selectively masking and roughening the side of the fiber surface, a sign or display can be created.

Referring now to FIG. 3, a depiction of color wheel 14 is shown as in FIG. 1. It can be seen that the external edge or periphery of the color wheel has teeth 31, which engage with drive gear 17, which causes the wheel to rotate. What is described now is one of many possible embodiments for putting a pattern upon this color wheel, including which colors may be used. The particular embodiment shows the wheel broken into six areas, three of them, 32,35 and 36, transparent with either a clear or color coating and three of them with alternate opaque stripes and clear with the same color or transparent coating. As an example, when red section 32 is between the light source and the fiber bundle, all of the fibers will be emitting a red light from their perspective areas on the sign. When the fiber area comprising what is labeled "red twinkle" is between the fiber bundle and the light source, alternately open area 33 and closed area 34 will cause a twinkling effect. This is also repeated for green in areas 40 and 41 in clear for 37 and 38. As can be deduced, as the wheel turns a portion of one area may be between the light source and the fiber bundle along with a portion of another area, thus the sign can look quite different. Since the fibers are not necessarily lined up side by side with the way they come out the bundle on the end, this will give a very interesting and entertaining effect as the light transfers across the fibers where some of the fibers would be on solid while some are twinkling.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

It is understood that bundle of fibers includes a flat array of individual circular fibers arranged side-by-side with both masked and unmasked portions exposed on the outer surfaces of the fiber which presents the visual patterns.

Furthermore, although the wheel is illustrated with pie-shaped segments or sections, the shape of the segments or sections may be of other geometric configurations. The shape may be regular or irregular. Different color patterns may be employed so as to provide a mixed pattern or even a singular one color may be used. The entire wheel surface may be of a solid color or design or may be of an irregular pattern such as a zebra striped pattern.

While particular embodiments of the present invention have been shown and described, it will be obvious to those skilled in the art that changes and modifications may be made without departure from this invention in its broader aspects and, therefore, the aim in the appended claims is to cover all such changes and modifications as fall within the true spirit and scope of this invention.

What is claimed is:

1. A fiber optic display device comprising:

a light source;

a plurality of optical fibers arranged in a bundle with each fiber having an external surface and having opposite ends of which one end resides adjacent to said light source and the other end of said opposite ends ending in a termination;

said bundle of fibers adapted to conduct light from said light source to said termination of each of said fibers;

said external surface of each of said fibers being selectively roughened for emitting diffused light through said roughened surface to create a graphic display;

said roughened surface selected from:
   a. a slight kinking of a selected optical fiber;
   b. a blasted surface;
   c. an uneven surface;

selectively masking portions of said external surface of each of said fibers to permit emitting of diffused light only via said roughened surface and said terminations;

a color wheel disposed between said light source and said bundle of fibers in adjacent, spaced-apart relationship with respect to said termination of each of said opposite ends;

said color wheel includes alternate pie-shaped segments of color composition and pie-shaped segments of striped segments;

said color segments are selected from the colors of green, red and clear;

said striped segments include alternate diagonal strips of red twinkle, green twinkle and clear twinkle;

a motor for driving said color wheel;

a gear arrangement operably coupling said motor to said color wheel;

said gear arrangement includes peripheral gear teeth carried along a peripheral edge of said color wheel and a drive gear intercoupling said motor with said peripheral gear teeth;

said color wheel segments constitute a pattern divided into at least six areas, three areas of which are transparent with either a clear or color coating and three of which are alternate opaque stripe and clear with the same color or a transparent coating.

2. A fiber optic display device comprising:

a light source;

a bundle of optical fibers adjacent to said light source and having a flat exterior surface and said fibers being laid together in a side-by-side relationship;

selected areas of each fiber being roughened so as to cause light conducted through said fibers to emit through non-selected, exposed areas of said fiber;

other areas of said fiber being selectively masked to prevent light from escaping from said fibers at said other areas;

said roughened areas being defined as uneven with irregular high and low points;

a color wheel rotatably disposed between said light source and said bundle of optical fibers;

a gear arrangement including a motor and a gear train connected with said color wheel for rotating said color wheel adjacent to said selected areas;

said bundle of optical fibers terminate at an end remote from said light source and said termination constitutes a first display pattern;

said roughened and masked areas constituting a second display area; and said bundle of fibers in said side-by-side relationship is a flat array with a plurality of said fibers arranged alternately exposing said masked portions and said roughened portions.

\* \* \* \* \*